United States Patent [19]
Scott et al.

[11] Patent Number: 5,816,286
[45] Date of Patent: Oct. 6, 1998

[54] PRESSURE UNLOADING PILOT OPERATED REGULATOR HAVING PRESSURE LIMITING CHECK VALVE

[75] Inventors: Gary L. Scott; William Jacob Bonzer; Frank E. Jensen, all of Marshalltown, Iowa

[73] Assignee: Fisher Controls International, Inc., Clayton, Mo.

[21] Appl. No.: 866,525

[22] Filed: May 30, 1997

[51] Int. Cl.[6] .................................................. F16K 31/12
[52] U.S. Cl. ................... 137/489; 137/489.5; 137/599.1
[58] Field of Search ................. 137/489, 489.5, 137/488, 599, 599.1; 251/33

[56] References Cited

U.S. PATENT DOCUMENTS

| | | | |
|---|---|---|---|
| 1,357,837 | 11/1920 | Bouvier | 137/489 |
| 2,991,796 | 7/1961 | Griswold | 137/489 |
| 3,592,223 | 7/1971 | Reese | 137/489 |
| 3,669,143 | 6/1972 | Reese | 137/489 |
| 3,977,423 | 8/1976 | Clayton | 137/489 |
| 4,000,754 | 1/1977 | Risk | 137/489 |
| 4,182,360 | 1/1980 | Neff | 137/599 |
| 4,380,250 | 4/1983 | Stoll | 137/599 |
| 4,669,493 | 6/1987 | Kober | 137/489 |
| 5,348,036 | 9/1994 | Oksanen | 137/489.5 |

OTHER PUBLICATIONS

Fisher Controls Instruction Manual, Type 2ST Regulators, pp. 1–5, Aug. 1995.
Fisher Controls Bulletin 71.2:399A–161, Type 399A Regulator, pp. 1–11, Mar. 1996.

*Primary Examiner*—Denise L. Ferensic
*Assistant Examiner*—Ramyar Farid
*Attorney, Agent, or Firm*—Marshall, O'Toole, Gerstein, Murray & Borun

[57] ABSTRACT

A pressure unloading pilot operated fluid pressure regulator having a throttling element for controlling fluid flow. A pilot amplifier senses regulator outlet pressure and supplies suitable loading pressure coupled from an inlet supply pressure line through a variable flow restrictor to the throttling element. A check valve has a preset differential pressure defined between the check valve inlet and outlet and is mounted in parallel flow with the flow restrictor to limit the maximum differential pressure across the throttling element to the preset differential pressure of the check valve.

7 Claims, 1 Drawing Sheet

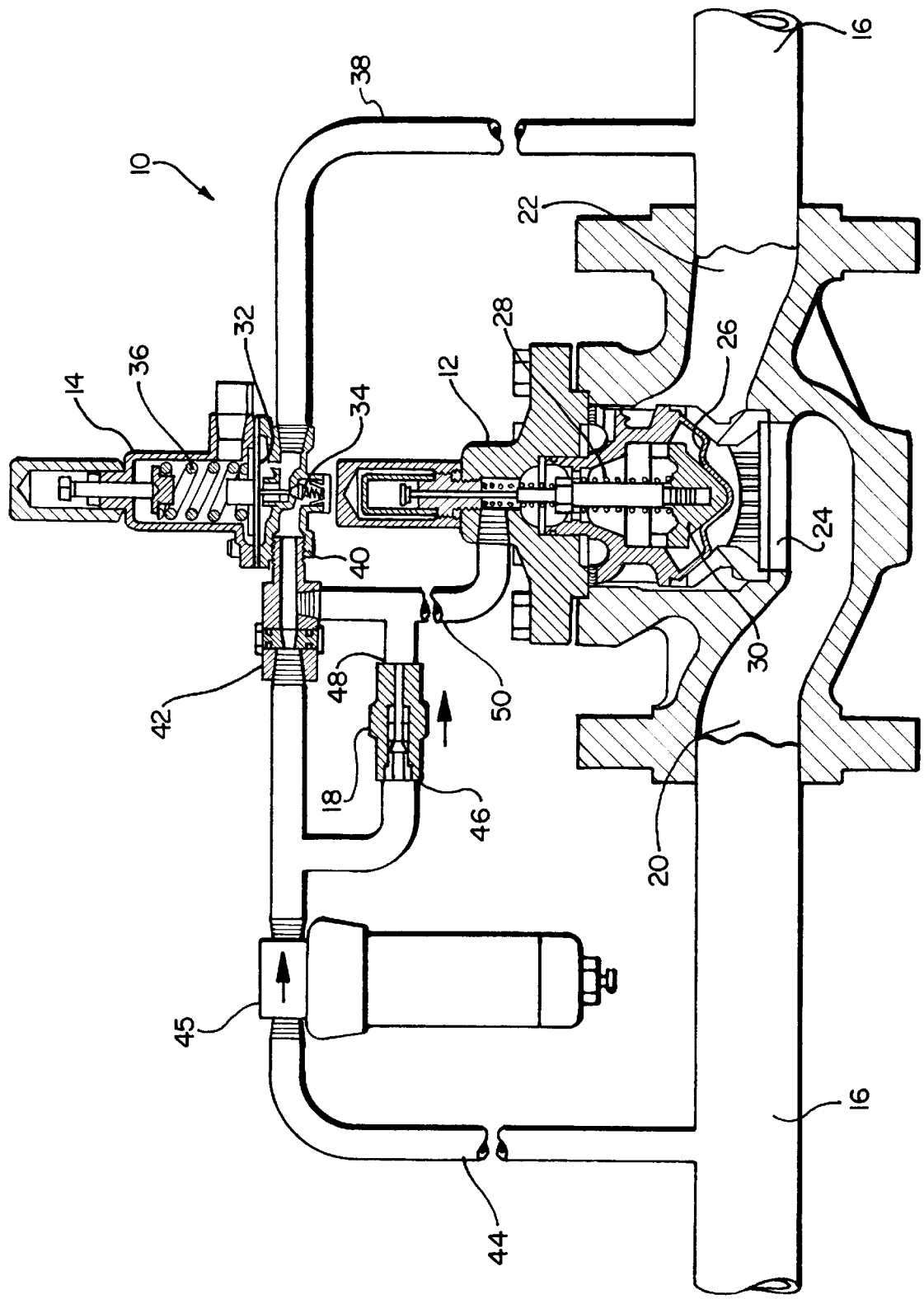

PRESSURE UNLOADING PILOT OPERATED REGULATOR HAVING PRESSURE LIMITING CHECK VALVE

This invention relates to fluid pressure regulator valves, and in particular to pressure unloading pilot operated fluid pressure regulators.

BACKGROUND OF THE INVENTION

Fluid flow regulator valves are in common use in gas and steam pipe line systems to assist in maintaining system pressure within acceptable limits. As an example, the primary function of a gas pressure regulator is to match the flow of gas through the regulator to the demand for gas placed upon the system. Also, the pressure regulator must maintain the system pressure within acceptable limits. The pressure regulator can include a pilot amplifier inserted in the pressure sensing line for supplying a loading pressure to one side of a flow throttling element, such as an elastomeric diaphragm element, in the main regulator valve to control the fluid flow through the main pressure regulator valve.

In one such type of pilot operated pressure regulator known as the "unloading" type, the pilot amplifier reduces the loading pressure to the main regulator in order to throttle the main regulator valve open. In such a pressure unloading pilot operated regulator, with an elastomeric diaphragm in the main pressure regulator, the differential pressure across the diaphragm consists of the inlet pressure on one side of the diaphragm and the loading pressure on the opposite side of the diaphragm. In certain situations, such as on systems start-up or shut-down, or other cases, the differential pressure across the elastomeric diaphragm can be an undesirably high amount. For instance, the inlet pressure may be at 1000 psi whereas the loading pressure may only be 100 psi or less. Such large differential pressures often cause a rupture or other damage of the diaphragm and require costly and time consuming shut downs for repair purposes.

Accordingly, it is desired to provide a pressure unloading pilot operated regulator wherein the differential pressure across the main regulator diaphragm is maintained within an acceptable range so as not to cause damage to the diaphragm, while still enabling the pressure regulator to maintain system pressure within acceptable limits.

SUMMARY OF THE INVENTION

A pressure unloading pilot operator fluid pressure regulator includes a flow throttling element for controlling the fluid flow between the regulator inlet and the regulator outlet. One side of the throttling element is subjected to the inlet pressure at the regulator inlet. A pilot regulator valve senses the regulator outlet pressure and provides a suitable reduced loading pressure to the other side of the flow throttling element to define a differential pressure Dp across the throttling element, and thereby enables fluid flow between the regulator inlet and the regulator outlet. A flow restrictor mounted intermediate the regulator inlet and the other side of the flow throttling element supplies loading pressure so as to unload the differential pressure Dp across the throttling element in response to the pilot regulator valve sensing the regulator outlet pressure. The pilot regulator controls the fluid flow between the regulator inlet and the regulator outlet.

A fluid check valve permits fluid flow in only one direction through the check valve from the check valve inlet to the check valve outlet. The check valve has a preset differential pressure Dpcv across the check valve so that fluid flow through the check valve is permitted only when the pressure exceeds the preset differential pressure. The check valve inlet communicates with the regulator inlet pressure on one side of the throttling element. The check valve outlet communicates the loading pressure to the other side of the throttling element. Accordingly, the fluid check valve limits the maximum differential pressure Dp across the throttling element to the preset differential pressure Dpcv of the fluid check valve.

Limiting the maximum differential pressure Dp across the throttling element prevents damage to the throttling element during start-up or shut-down or at other instances wherein a large differential pressure across the throttling element can be undesirably developed. In addition, the combination of the check valve and the pressure unloading pilot operated pressure regulator provides a higher speed of regulator response as the regulator goes from a wide open position to a control or throttling position. That is, in instances where the elastomeric diaphragm element is not ruptured (or a non-elastomeric diaphragm element is present), and there is a large developed differential pressure across the throttling element, without the check valve, the regulator is responding to a large range of pressure differences in going from the wide open position to a control position. In contrast, with the combination of a check valve in parallel with the flow restrictor, the differential pressure between the inlet pressure and the loading pressure is maintained in a narrow range so that the regulator responds much faster in going from a wide open position to a control position.

BRIEF DESCRIPTION OF THE DRAWING

The features of this invention which are believed to be novel are set forth with particularity in the appended claims. The invention may be best understood by reference to the following description taken in conjunction with the accompanying drawing, in which like reference numerals identify like elements in the FIGURE and in which:

FIG. 1 is a schematic view illustrating a pressure unloading pilot operated fluid pressure regulator which includes a fluid check valve in accordance with the present invention.

DETAILED DESCRIPTION

Referring now to FIG. 1, there is illustrated a pressure unloading pilot operated fluid pressure regulator 10 which includes a main pressure regulator valve 12 controlled by a pilot amplifier 14 for regulating and controlling the flow of fluid in a pipeline 16. The pilot operated pressure regulator 10 includes a check valve 18 in accordance with the present invention.

Main regulator 12 includes a regulator inlet 20 and a regulator outlet 22, with a cage 24 mounted in the valve body passageway between inlet 20 and outlet 22. An elastomeric diaphragm throttling element 26 is mounted within the valve body such that when the pressure above the diaphragm exceeds the pressure below the diaphragm, the diaphragm is urged against the top of cage 24 so as to shut off the flow of fluid between regulator inlet 20 and regulator outlet 22. Conversely, when the pressure below the diaphragm 26 exceeds the pressure above the diaphragm, this enables the diaphragm to flex upwardly, unseated from the cage 24 so as to permit fluid flow through the regulator 12. Diaphragm 26 is maintained in the shut off position by a main diaphragm spring 28. Movement of the diaphragm 26 upwardly in response to a suitable differential pressure across the diaphragm drives a diaphragm support 30 upwardly.

Pilot amplifier 14 includes a pilot diaphragm 32 connected to a pilot valve plug 34. A pilot spring 36 acts on the pilot diaphragm to open the pilot valve plug 34.

A pilot control line 38 senses the regulator output pressure at the regulator outlet 22 and is coupled to the pilot amplifier 14 to communicate the sensed outlet pressure below the pilot diaphragm 32. A pilot inlet 40 is connected to a variable flow restrictor 42 having a variable sized orifice for flow restriction and varying the flow rate at the restrictor outlet. The inlet to the flow restrictor 42 is coupled to an input supply pressure line 44. An intermediate fluid filter 45 may be utilized if desired to filter the inlet fluid before the fluid reaches the regulator components.

The output of the variable fluid flow restrictor 42 connected to the pilot inlet 40 is also connected to a loading pressure line 48 which in turn is connected to the main regulator valve 12 so as to communicate loading pressure through the valve passageways to the top of the main diaphragm 26. Check valve 18 is a one way fluid operating device which permits fluid to flow only in the direction indicated by the reference arrow and between check valve inlet 46 and a check valve outlet 48. In addition, fluid flow through the check valve 18 commences only after a preset differential pressure, Dpcv, between the check valve inlet 46 and the check valve outlet 48 (i.e., across the check valve) is exceeded. Thus, if the preset differential pressure, Dpcv for the check valve 18 is 50 psi, then fluid flow through the check valve 18 will only occur when this preset differential pressure is exceeded. Check valve 18 is inserted so as to be in a parallel fluid flow position with respect to the variable flow restrictor 42.

The operation of the pressure unloading pilot operated pressure regulator 10 is as follows. In the regulator "locked up" position, there is no fluid flow between regulator inlet 20 and outlet 22. The main diaphragm spring 28 acts to shut off the diaphragm 26.

The outlet pressure on the pilot control line 38 is above the pilot control spring set pressure so that the pilot diaphragm 32 is maintained in an upward position and the pilot valve plug 34 remains closed. In this condition, inlet pressure bleeding through the flow restrictor 42 into the loading pressure line 50 provides loading pressure on the diaphragm 26 to keep the diaphragm tightly shut off.

As apparatus on the downstream side of pipe line 16 is placed into service, the downstream pressure and therefore the outlet pressure at the regulator outlet 22 decreases, below the pilot control spring setting. The pilot valve plug 34 opens to communicate the outlet of flow restrictor 42 through the pilot inlet 40 and to exhaust through line 38 to the downstream pipeline 16. Loading pressure supplied to loading pressure line 50 from the restrictor 42 is now being bleeded downstream through the pilot valve faster than it can be replaced through the restrictor. If we assume here that the differential pressure Dpcv of the check valve 18 has not been exceeded, the loading pressure bleeding downstream through the pilot reduces the loading pressure on top of the diaphragm 26 and enables the inlet pressure at the regulator inlet 20 to unbalance open the diaphragm 26 from the bottom, so as to supply increased pressure to the regulator outlet 22 and the downstream pipeline 16.

As the outlet pressure at regulator outlet 22 rises toward the pressure setting of pilot control spring 36, the pilot diaphragm is moved upwardly against the pilot control spring and closes the pilot valve plug. Loading pressure from the flow restrictor 42 can again build up and be supplied through the loading pressure line 50 to the top of the diaphragm so as to close the diaphragm 26. The diaphragm support 30 moves with the diaphragm to provide motion indication and to support the diaphragm when open.

The above operational description relates to a normal operation of the regulator 10 without regard to the check valve 18 and is presently supplied for instance by a regulator type 339A commercially available from Fisher Controls International, Inc. of Marshalltown, Iowa. However, under certain conditions such as start-up or shut-down, the input pressure at the regulator inlet 20 supplied below the diaphragm 26 substantially exceeds the loading pressure from line 50 supplied to the top of the diaphragm 26. Occasionally, this differential pressure exceeds the maximum differential pressure allowed across the diaphragm and thereby causes rupturing or damage to the diaphragm.

As an example, if the input pressure is about 1000 psi and the outlet pressure at regulator outlet 22 is about 100 psi, as described previously, the pilot valve plug 34 is open so that the loading pressure normally supplied from flow restrictor 42 is being bleeded through the pilot amplifier 14 to the control line 38. Therefore, assuming the check valve 18 is not in the regulator, under this condition the differential pressure across the diaphragm 26 can be 900 psi which can cause damage and reduce the life expectancy of the diaphragm.

In contrast, such a condition can not occur with the check valve 18 in position. Whenever the differential pressure across the check valve exceeds the preset differential pressure of the check valve, the check valve 18 will permit fluid flow through the check valve to supply loading pressure to loading pressure line 50. The maximum differential pressure across the diaphragm 26 is therefore limited to be substantially equal to the preset differential pressure of the check valve 18. Thus, if the preset check valve differential pressure is set at 50 psi, then the maximum differential pressure across the diaphragm 26 is substantially limited to not exceed about 50 psi. With a check valve 18 having a preset differential pressure of 50 psi, the maximum differential pressure across the diaphragm is about 50 psi. Two constructed embodiments of the check valve 18 have respective preset differential pressures of 50 and 100 psi.

Instead of the variable flow restrictor 42 having a variable orifice to obtain a variety of desired flow rates, a restrictor with a fixed orifice may of course be utilized. Also, it can be seen that the check valve 18 can operate with any type of pressure unloading pilot operated pressure regulator which incorporates a flexible, diaphragm of elastomeric material, so as to limit the maximum pressure differential across the diaphragm and thereby prevent damage thereto. Another advantage of the check valve is in enabling a faster regulator response to be provided when going from a wide open regulator position to a control situation. It may be noted that utilizing the check valve 18 enables the loading pressure on line 50 to be maintained to no more than the level of the preset differential pressure of the check valve below the inlet pressure. Therefore, the check valve 18 may also be utilized in a pressure unloading pilot operated fluid pressure regulator having a throttling element which is of non-elastomeric material to obtain a faster recovery from a wide open position to a control position.

The foregoing detailed description has been given for clearness of understanding only, and no unnecessary limitations should be understood therefrom, as modification will be obvious to those skilled in the art.

What is claimed is:

1. In a pressure unloading pilot operated fluid pressure regulator having an inlet and an outlet, including a flow throttling element having two sides for controlling the fluid flow between the regulator inlet and the regulator outlet, with one side of the throttling element subjected to the inlet pressure at the regulator inlet, a pilot regulator valve sensing the regulator outlet pressure and providing a suitable reduced loading pressure to the other side of the flow throttling element through a loading conduit to define a differential pressure Dp across the throttling element, and thereby enable fluid flow between the regulator inlet and the regulator outlet, and a flow restrictor mounted in an inlet sensing conduit intermediate the regulator inlet pressure and the other side of the flow throttling element for supplying the loading pressure so as to unload the differential pressure Dp across the throttling element in response to the pilot regulator valve sensing the regulator outlet pressure, and thereby restricting fluid flow between the regulator inlet and the regulator outlet, the improvement comprising;

- a fluid check valve enabling fluid flow in only one direction through the check valve from the check valve inlet to the check valve outlet upon the pressure at the check valve exceeding a preset differential pressure Dpcv across the check valve;

- the fluid check valve located in a bypass conduit having two ends, one end coupled to the inlet sensing conduit upstream of the restrictor and the other end coupled to the loading conduit downstream of the restrictor;

- the fluid check valve inlet communicating with the regulator inlet pressure on the one side of the throttling element and the fluid check valve outlet communicating with the loading pressure on the other side of the throttling element;

- the fluid check valve limiting the maximum differential pressure Dp across the throttling element to the preset differential pressure Dpcv of the fluid check valve.

2. A pressure unloading pilot operated fluid pressure regulator according to claim 1, wherein said throttling element is an elastomeric diaphragm.

3. A pressure unloading pilot operated fluid pressure regulator according to claim 1, wherein said preset differential pressure across said check valve is set at about 50 psi.

4. A pressure unloading pilot operated fluid pressure regulator according to claim 1, wherein said preset differential pressure across said check valve is set at about 100 psi.

5. A pressure unloading pilot operated fluid pressure regulator according to claim 2, wherein said flow restrictor is variable to enable a selected variable flow rate through said flow restrictor.

6. A pressure unloading pilot operated fluid pressure regulator according to claim 5, wherein said preset differential pressure across said check valve is set at about 50 psi.

7. A pressure unloading pilot operated fluid pressure regulator according to claim 2, wherein said flow restrictor is fixed to provide a fixed flow rate through said flow restrictor.

* * * * *